US010503399B2

(12) United States Patent
Chu

(10) Patent No.: US 10,503,399 B2
(45) Date of Patent: Dec. 10, 2019

(54) ADJUSTING THE DISPLAY AREA OF APPLICATION ICONS AT A DEVICE SCREEN

(71) Applicant: Alibaba Group Holding Limited, George Town (KY)

(72) Inventor: Tianying Chu, Hangzhou (CN)

(73) Assignee: Alibaba Group Holding Limited (KY)

( * ) Notice: Subject to any disclaimer, the term of this patent is extended or adjusted under 35 U.S.C. 154(b) by 441 days.

(21) Appl. No.: 14/968,581

(22) Filed: Dec. 14, 2015

(65) Prior Publication Data
US 2016/0188189 A1 Jun. 30, 2016

(30) Foreign Application Priority Data
Dec. 31, 2014 (CN) .......................... 2014 1 0852523

(51) Int. Cl.
G06F 3/0488 (2013.01)
G06F 3/0346 (2013.01)
G06F 3/0481 (2013.01)
G06F 1/16 (2006.01)

(52) U.S. Cl.
CPC ........ G06F 3/04886 (2013.01); G06F 1/1694 (2013.01); G06F 3/0346 (2013.01); G06F 3/04817 (2013.01); *G06F 2200/1637* (2013.01)

(58) Field of Classification Search
CPC ............... G06F 3/0346; G06F 3/04847; G06F 3/04817; G06F 3/0414; G06F 3/017; G06F 9/4446; G06F 3/04895; G06F 17/30525; G06F 11/08; G06F 3/0488; G06F 3/04883; G06F 3/0236; G06F 3/0418; G06F 3/0481; G06F 3/0484; G06B 5/06
See application file for complete search history.

(56) References Cited

U.S. PATENT DOCUMENTS

| 5,627,567 A * | 5/1997 | Davidson .............. G06F 3/0488 |
| | | 345/170 |
| 6,400,376 B1 | 6/2002 | Singh |
| 7,184,025 B2 * | 2/2007 | Williams .............. G06F 1/1626 |
| | | 345/169 |
| 7,479,949 B2 | 1/2009 | Jobs |
| 7,633,076 B2 | 12/2009 | Huppi |
| 8,005,512 B2 * | 8/2011 | Bengtsson ........ H04M 1/72519 |
| | | 455/566 |
| 8,351,773 B2 | 1/2013 | Nasiri |
| 8,418,085 B2 * | 4/2013 | Snook .................... G06F 3/017 |
| | | 715/707 |
| 8,487,882 B2 * | 7/2013 | Inaba .................... G06F 1/1616 |
| | | 345/158 |

(Continued)

FOREIGN PATENT DOCUMENTS

CN 101158889 4/2008
CN 103064629 4/2013
(Continued)

*Primary Examiner* — Nicholas Klicos
(74) *Attorney, Agent, or Firm* — Van Pelt, Yi & James LLP

(57) ABSTRACT

Adjusting the display area of application icons at a device screen is disclosed, including: obtaining a set of tilt angle parameters from a gravity sensor; determining a tilt angle and a tilt direction based at least in part on the set of tilt angle parameters; and adjusting a display area of a plurality of application icons at a screen based at least in part on the tilt angle, the tilt direction, or both.

13 Claims, 9 Drawing Sheets

(56) References Cited

U.S. PATENT DOCUMENTS

| | | |
|---|---|---|
| 8,872,854 B1 | 10/2014 | Levitt |
| 9,285,883 B2* | 3/2016 | Bi .......................... G06F 1/1694 |
| 9,354,709 B1* | 5/2016 | Heller ..................... G06F 3/017 |
| 9,678,543 B2 | 6/2017 | Suzuki |
| 2002/0190962 A1 | 12/2002 | Miura |
| 2004/0178994 A1* | 9/2004 | Kairls, Jr. ............. G06F 3/0418 |
| | | 345/173 |
| 2006/0031014 A1* | 2/2006 | Sato ....................... G01C 17/38 |
| | | 701/530 |
| 2009/0106694 A1* | 4/2009 | Kraft ..................... G06F 3/0236 |
| | | 715/815 |
| 2009/0172562 A1* | 7/2009 | Lai ...................... G06F 3/04817 |
| | | 715/745 |
| 2009/0307633 A1 | 12/2009 | Haughay, Jr. |
| 2009/0322691 A1* | 12/2009 | Chiu ..................... G06F 1/1626 |
| | | 345/173 |
| 2010/0017759 A1* | 1/2010 | Birnbaum .............. G06F 1/1613 |
| | | 715/863 |
| 2010/0030469 A1* | 2/2010 | Hwang .................. G01C 21/36 |
| | | 701/533 |
| 2010/0138766 A1* | 6/2010 | Nakajima ............. G06F 1/1626 |
| | | 715/767 |
| 2011/0161884 A1* | 6/2011 | Dugan .................. G06F 1/1626 |
| | | 715/843 |
| 2011/0216004 A1 | 9/2011 | Stephenson |
| 2011/0254792 A1* | 10/2011 | Waters .................. G06F 1/1626 |
| | | 345/173 |
| 2011/0267280 A1* | 11/2011 | De Mers ............. G06F 3/04886 |
| | | 345/173 |
| 2011/0306304 A1 | 12/2011 | Forutanpour |
| 2012/0036468 A1* | 2/2012 | Colley .................. G06F 3/0418 |
| | | 715/773 |
| 2012/0056830 A1* | 3/2012 | Suzuki .................. G06F 1/1626 |
| | | 345/173 |
| 2012/0056878 A1* | 3/2012 | Miyazawa ............. G06F 1/1626 |
| | | 345/419 |
| 2012/0075182 A1* | 3/2012 | Kim ....................... G06F 3/0338 |
| | | 345/158 |
| 2012/0109923 A1* | 5/2012 | Pasquero .......... G06F 17/30864 |
| | | 707/706 |
| 2012/0133677 A1* | 5/2012 | Suzuki .................. G06F 1/1694 |
| | | 345/649 |
| 2012/0158629 A1* | 6/2012 | Hinckley ................ G06F 3/038 |
| | | 706/15 |
| 2012/0162261 A1* | 6/2012 | Kim ........................ G06F 3/017 |
| | | 345/647 |
| 2012/0169613 A1* | 7/2012 | Armstrong ............ G06F 3/0233 |
| | | 345/173 |
| 2012/0188243 A1* | 7/2012 | Fujii ....................... G06T 19/20 |
| | | 345/426 |
| 2012/0206129 A1* | 8/2012 | Mahan .................. G01C 17/38 |
| | | 324/202 |
| 2013/0111384 A1 | 5/2013 | Kim |
| 2013/0120464 A1* | 5/2013 | Wei ..................... G06F 3/04842 |
| | | 345/672 |
| 2013/0135203 A1* | 5/2013 | Croughwell, III .... G06F 1/1626 |
| | | 345/158 |
| 2013/0147794 A1* | 6/2013 | Lee ..................... G06F 3/04815 |
| | | 345/419 |
| 2013/0212487 A1* | 8/2013 | Cote ........................ G06F 9/451 |
| | | 715/745 |
| 2013/0268879 A1* | 10/2013 | Zhang ................... G06F 3/0418 |
| | | 715/773 |
| 2014/0062932 A1* | 3/2014 | Ebata .................. G06F 3/04886 |
| | | 345/173 |
| 2014/0215365 A1* | 7/2014 | Hiraga ................ G06F 3/04883 |
| | | 715/765 |
| 2014/0223328 A1* | 8/2014 | Thomas .................... G06F 3/14 |
| | | 715/747 |
| 2014/0267057 A1* | 9/2014 | Zhao ..................... G06F 1/1694 |
| | | 345/169 |
| 2014/0320387 A1 | 10/2014 | Eriksson |
| 2015/0029093 A1* | 1/2015 | Feinstein ............... G01B 21/22 |
| | | 345/156 |
| 2015/0084885 A1* | 3/2015 | Kawamoto ........... G06F 3/0482 |
| | | 345/173 |
| 2015/0268733 A1* | 9/2015 | Govindapillai ......... G06F 3/017 |
| | | 715/863 |
| 2016/0077650 A1* | 3/2016 | Durojaiye ............... G06F 3/041 |
| | | 345/173 |
| 2016/0188203 A1* | 6/2016 | Fu ....................... G06F 3/04886 |
| | | 715/773 |
| 2017/0160926 A1* | 6/2017 | Barkway ............. G06F 3/04886 |
| 2017/0351399 A1* | 12/2017 | Pallakoff ............... G06F 3/0488 |
| 2018/0004402 A1* | 1/2018 | Liang .................. G06F 3/04845 |

FOREIGN PATENT DOCUMENTS

| | | |
|---|---|---|
| EP | 2458478 | 5/2012 |
| JP | 2008003671 | 1/2008 |
| JP | 2011086036 | 4/2011 |
| JP | 2013073529 | 4/2013 |
| JP | 2013077270 | 4/2013 |
| JP | 2013149027 | 8/2013 |
| JP | 2014010780 | 1/2014 |
| JP | 2014197334 | 10/2014 |
| KR | 20090132393 | 12/2009 |
| KR | 20130060095 | 6/2013 |
| KR | 20140061042 | 5/2014 |

* cited by examiner

– 1 –

ADJUSTING THE DISPLAY AREA OF APPLICATION ICONS AT A DEVICE SCREEN

CROSS REFERENCE TO OTHER APPLICATIONS

This application claims priority to People's Republic of China Patent Application No. 201410852523.9 entitled A DEVICE AND METHOD FOR ADJUSTING THE DISTRIBUTION AREA OF INTERFACE OPERATION ICONS, AND TOUCH SCREEN EQUIPMENT, filed Dec. 31, 2014 which is incorporated herein by reference for all purposes.

FIELD OF THE INVENTION

The present application involves the field of touchscreen technology. In particular, the present application involves techniques for adjusting the display of the icons on a touchscreen.

BACKGROUND OF THE INVENTION

With the continuous development of mobile hardware technology, large-screen mobile devices, such as smartphones and tablets, for example, have become a development trend. Increasingly, more and more mobile devices use large screens. With larger screens, users are able to obtain a better user experience when viewing pictures, videos and web pages. However, because the screens of mobile devices are now big and wide, users may have difficulty in conveniently operating the device as the icons associated with applications are typically displayed throughout the screen, even in areas that are difficult to reach. For example, a user may typically desire to operate a large screen mobile device with one hand but may have trouble touching locations at the far top, far bottom, far left or far right of the screen with just the one hand. For example, certain operating systems that run on mobile devices allow the mobile device to be unlocked when a user swipes his or her finger across a presented scroll. However, if the screen of the mobile device is large, then the user may not be able to conveniently swipe his or her finger across the scroll with one hand to complete the operation of unlocking.

Currently, certain mobile operating systems are configured with a function to improve the user's reach to the icons that are presented at a touchscreen. This function is triggered when the user double taps the home key on a device such as a smartphone, for example, and the operating system rearranges the application icons that were previously displayed at the top half of the mobile phone screen to be displayed on the lower half of the screen such that no application icons are displayed at the top half of the screen. However, the following issues are present in the use of this technique of double-tapping the home key: 1) the display area of the application icons is fixed to half of its original height, and there is no way for the user to define/customize the height and width of the display area of the application icons; 2) the invocation operation of double-tapping the home key is a relatively hidden operation technique and after the display area of the application icons has been adjusted, if the user touches the screen, the application icons are rearranged into their original positions across the entire screen; and 3) the technique is unable to intelligently judge the user's true needs and automatically provide a settings prompt panel in response. Therefore, there is a need for large-screen mobile devices, including smartphones and tablets, to allow the user to customize the display area of the application icons on their device screens.

BRIEF DESCRIPTION OF THE DRAWINGS

Various embodiments of the invention are disclosed in the following detailed description and the accompanying drawings.

DETAILED DESCRIPTION

Figure 1:
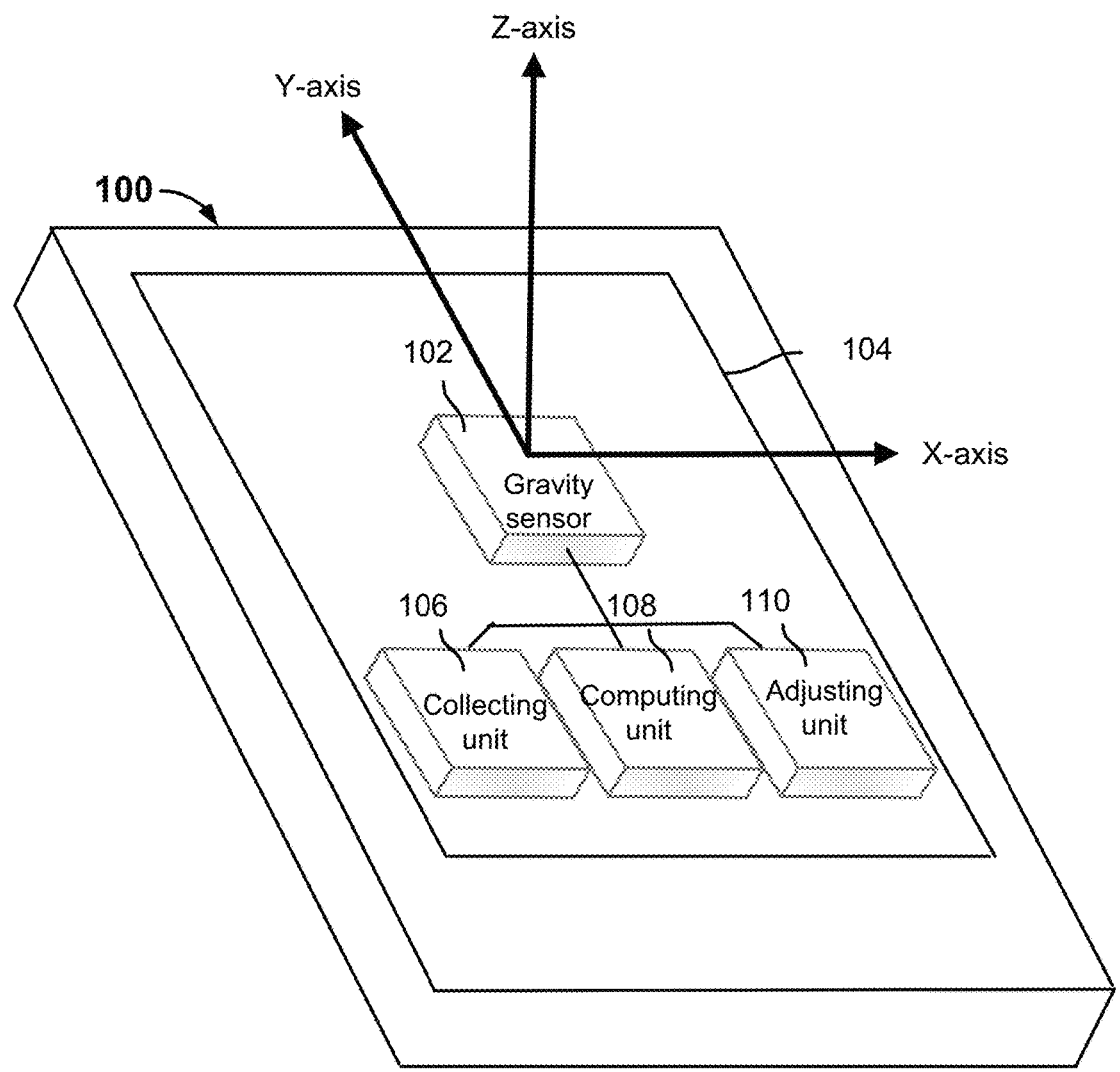
FIG. 1 is a diagram showing an embodiment of a system for adjusting the display area of application icons at a device screen.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of adjusting the display area of application icons at a device screen are described herein. In various embodiments, a gravity sensor configured as a part of a device is configured to measure the tilt angle parameters of the device. In various embodiments, the display area of the application icons at the screen of the device is adjusted based on the measured tilt angle parameters. In various embodiments, a tilt angle and a tilt direction are determined from the determined tilt angle parameters. At least one of the tilt angle and the tilt direction is used to adjust the display area of the application icons at the screen of the device. In various embodiments, adjusting the display area of application icons comprises adjusting the size (e.g., length and width dimensions), orientation, and/or location of the display area of application icons at the screen of the device. In some embodiments, adjusting the display area of application icons at the screen of the device comprises adjusting the locations of the application icons that are presented at the screen of the device, relative to their original locations.

FIG. 1 is a diagram showing an embodiment of a system for adjusting the display area of application icons at a device screen. In the example, device 100 comprises a device with touchscreen 104. Examples of device 100 include mobile devices such as a smartphone or a tablet computer. Touchscreen 104 comprises an input area with which a user can interact via touch. Touchscreen 104 is configured to display application icons associated with applications that are installed and/or executing at device 100. In various embodiments, touchscreen 104 can be implemented as a sensing liquid crystal display device capable of receiving touch and other input signals, such as a resistive touchscreen, a capacitive sensing touchscreen, or the like. When the displayed buttons on the screen are touched, the haptic feedback system on the screen can instruct the various connected components of the device based on computer code programmed in advance, thereby replacing the need for at least some mechanical button panels, and creating vivid audio-visual effects by means of the liquid crystal display. The touchscreen is currently the simplest, most convenient, and most natural form of human-machine interaction. It has given multimedia a whole new look, and is a highly attractive, completely new type of multimedia interaction equipment.

Device 100 comprises at least gravity sensor 102, collecting unit 106, computing unit 108, and adjusting unit 110. Each of gravity sensor 102, collecting unit 106, computing unit 108, and adjusting unit 110 may be implemented using hardware and/or software. For example, the units can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a device (such as smartphones, tablets, personal computers, servers, network equipment, etc.) implement the methods described in the embodiments of the present invention. The units may be implemented on a single device or distributed across multiple devices. The functions of the units may be merged into one another or further split into multiple sub-sub-units.

Gravity sensory 102 comprises a force-sensitive sensor, the operational principle of which is that the sensor uses the piezoelectric effect to realize gravity sensing technology.

The piezoelectric effect is the ability of certain materials to generate an electric charge in response to applied mechanical stress. Simply put, the magnitude of the component forces of gravity in two orthogonal directions of a weight inside the measurement equipment (the weight and the piezoelectric panel being made into a single whole) is used to determine the direction of the equipment. Using gravity sensor 102, changes in the center of gravity are detected when the orientation of touchscreen 104 changes, and tilt angle parameters are obtained based on the specific center of gravity change data.

In some embodiments, gravity sensor 102 refers to a gravity rocker chip built into device 100. Most smartphones and tablets now have built-in gravity sensors, and even some non-smart phones have built-in gravity sensors. In some embodiments, gravity sensor 102 supports the interfaces and functions associated with music playback, flip muting, and video playback that are associated with shaking device 100. Example applications of gravity sensor 102 include ball balancing games, horizontal browsing of web pages, and book reading. For example, after device 100 is turned 90 degrees by a user's hand from a vertical position to a horizontal position, the page that is presented at device 100 is automatically adjusted along with the center of gravity, i.e., the present page also turns 90 degrees, so that it can be rotated to the optimal viewing angle for the user.

Gravity sensor 102 utilizes changes in the tilt of device 100 relative to the face of the earth. In some embodiments, gravity sensor 102 comprises one or a combination of an accelerometer, the gyroscope, and the magnetic sensor. As shown in the diagram, gravity sensor 102 is configured to measure acceleration in three directions, X, Y, and Z, relative to device 100, in response to a movement of device 100. In various embodiments, the values of X, Y, and Z are referred to as the collected "tilt angle parameters." In some embodiments, the values of X, Y, and Z are measured in units of gravity, i.e., G-force (1 G=9.81 m/s$^2$). The following is one example scheme for setting the gravity sensing coordinates of gravity sensor 102: the lower left of touchscreen 104 is configured as the origin point when the surface of touchscreen 104 is parallel to the face of the earth and is facing up (away from the face of the earth), the direction in which each of the X, Y, and Z arrows point as shown in the diagram of FIG. 1 is positive and floating point numbers from −10 to 10 are used as the range of X, Y, and Z values. For example, when device 100 is placed parallel to the face of the earth and touchscreen 104 is facing up (away from the face of the earth), the values of (x, y, z) are (0, 0, 10), respectively; when device 100 is placed parallel to the face of the earth and touchscreen 104 is facing down (towards the face of the earth), the values of (x, y, z) are (0, 0, −10), respectively; when device 100 is turned to the left and is horizontal, the values of (x, y, z) are (10, 0, 0), respectively; when touchscreen 104 of device 100 is vertical and perpendicular to the face of the earth, the values of (x, y, z) are (0, 10, 0), respectively; and so forth for other positions.

Collecting unit 106 of device 100 is configured to collect the tilt angle parameters (e.g., the sets of X, Y, and Z values) that are measured by gravity sensor 102. Computing unit 108 of device 100 is configured to determine the tilt angle and tilt direction of device 100 based on each set of tilt angle parameters that are collected by collecting unit 106. Adjusting unit 110 is configured to adjust the display area of application icons at touchscreen 104 based on the tilt angle and/or tilt direction of device 100. In various embodiments, collecting unit 106, computing unit 108, and adjusting unit 110 can be implemented using one or more memories, one or more processors, or a combination. In various embodiments, adjusting the display area of application icons at touchscreen 104 comprises adjusting the size (e.g., length and width dimensions), orientation, and/or location of the display area of application icons at touchscreen 104. In some embodiments, adjusting the display area of application icons at touchscreen 104 comprises adjusting the locations at which at least some of the application icons are presented on touchscreen 104, relative to their original locations at touchscreen 104. Put another way, adjusting the display area of application icons at touchscreen 104 comprises changing the locations at which at least some of the application icons are displayed at touchscreen 104.

As will be described in further detail below, the tilting of device 100 (e.g., that is caused by a user holding device 100) is monitored by the components of device 100 and used to determine the adjustment of the display area of application icons at touchscreen 104. In various embodiments, the adjustment of the display area of application icons at touchscreen 104 results in the rearrangement of the application icons from their original positions at touchscreen 104 to new positions at touchscreen 104 that are determined based on the manner in which device 100 is tilted. A user can therefore tilt device 100, for example, with one hand, to rearrange the location of the application icons such that the user can conveniently reach/access the application icons with one hand. For example, such an adjustment may be desirable if at least some application icons that are desired to be accessed by the user are originally located in areas of touchscreen 104 that are difficult to reach by the user (e.g., using one hand to operate device 100). As such, by adjusting the display area of application icons such that the application icons are now presented at locations that are closer to the user's hand, the user may access the application icons with ease.

Figure 2:
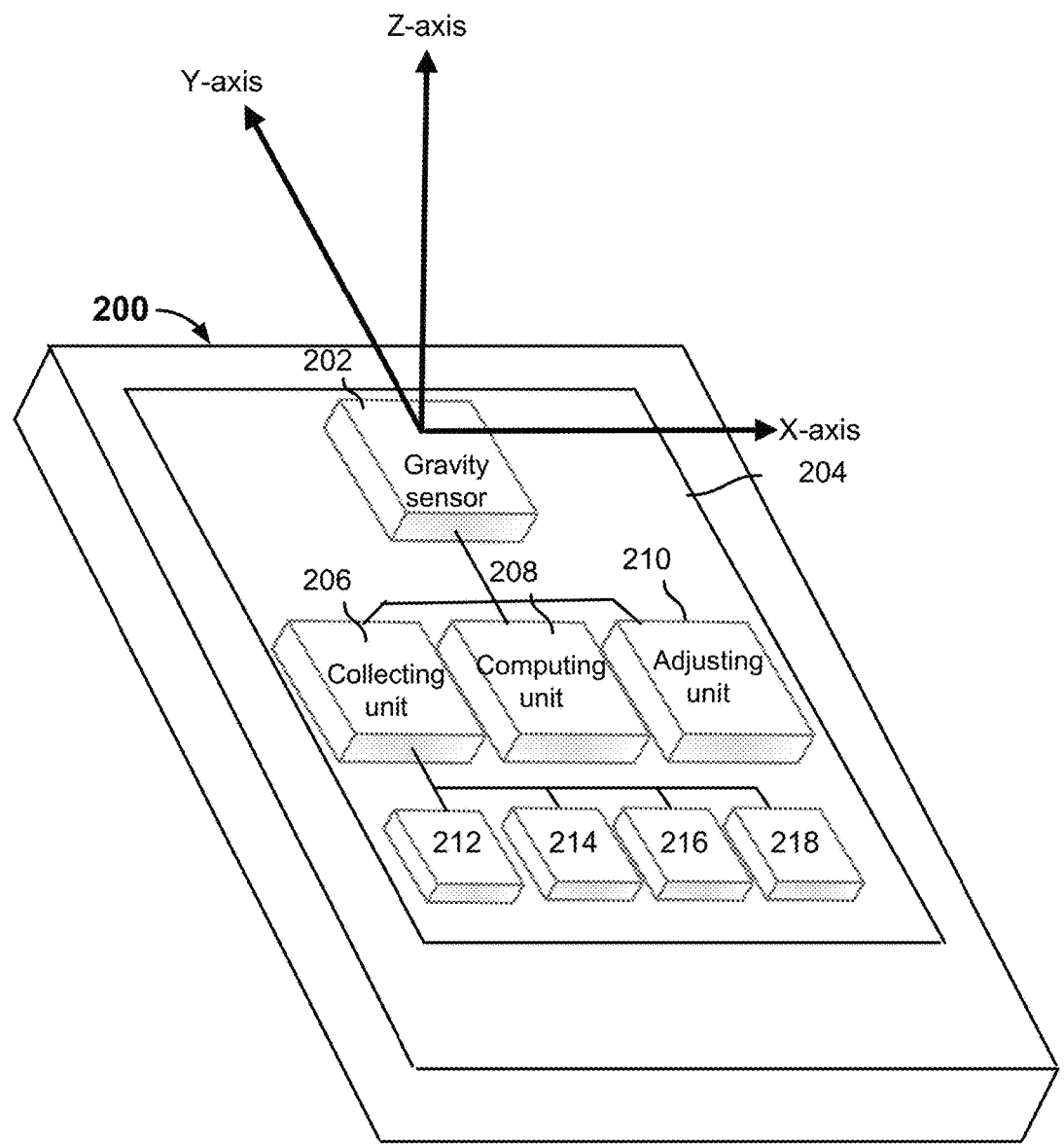
FIG. 2 is a diagram showing another embodiment of a system for adjusting the display area of application icons at a device screen.

FIG. 2 is a diagram showing another embodiment of a system for adjusting the display area of application icons at a device screen. In the example, device 200 comprises a device with touchscreen 204. Examples of device 200 include mobile devices such as a smartphone or a tablet computer. Touchscreen 204 comprises an input area with which a user can interact via touch. Touchscreen 204 is configured to display application icons associated with applications that are installed and/or executing at device 200.

Device 200 comprises at least gravity sensor 202, collecting unit 206, computing unit 208, adjusting unit 210, passive prompting unit 212, active prompting unit 214, storage unit 216, and restoring unit 218. Each of gravity sensor 202, collecting unit 206, computing unit 208, and adjusting unit 210 may be implemented similarly to gravity sensor 102, collecting unit 106, computing unit 108, and adjusting unit 110 of device 100 of FIG. 1. Each of passive prompting unit 212, active prompting unit 214, storage unit 216, and restoring unit 218 may be implemented using hardware and/or software. For example, the units can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a device (such as smartphones, tablets, personal computers, servers, network equipment, etc.) implement the methods described in the embodiments of the present invention.

Passive prompting unit 212 is configured to send to a display unit (not shown) of device 200 data associated with the settings prompt panel that presents information regarding how a user can tilt the device to adjust the display area of application icons at the device screen when a preset condition is met, as will be described in further detail below. Passive prompting unit 212 is further configured to receive a user selection to perform the adjustment of the display area of the application icons at the device screen. Passive prompting unit 212 is configured to trigger gravity sensor 202 to determine a set of tilt angle parameters, for example, in response to the display of the settings prompt panel and/or the received user selection to perform the adjustment of the display area of the application icons at the device screen.

Active prompting unit 214 is configured to send to a display unit (not shown) of device 200 data associated with the settings prompt panel that presents information regarding how a user can tilt the device to adjust the display area of application icons at the device screen when a preset option for setting the display area of application icons is selected by the user, as will be described in further detail below. Active prompting unit 214 is further configured to receive a user selection to perform the adjustment of the display area of the application icons at the device screen. Active prompting unit 214 is configured to trigger gravity sensor 202 to determine a set of tilt angle parameters, for example, in response to the display of the settings prompt panel and/or the received user selection to perform the adjustment of the display area of the application icons at the device screen.

Storage unit 216 includes a memory configured to store the adjusted display area of the application icons. In some embodiments, storing the adjusted display area of the application icons comprises to store the respective new location at touchscreen 204 of each application icon after the adjustment.

Restoring unit 218 includes a memory configured to store information about the original display area. It is configured to restore the adjusted display area of the application icons to the original display area and therefore causes the application icons to return to their original locations at touchscreen 204 in response to a user input restore command.

As will be described in further detail below, in response to a user's selection to perform the adjustment of the display area of the application icons at the device screen, the tilting of device 200 (e.g., that is caused by a user holding device 200) is monitored by the components of device 200 and used to determine the adjustment of the display area of application icons at touchscreen 204. In various embodiments, the adjustment of the display area of application icons at touchscreen 204 results in the rearrangement of the application icons from their original positions at touchscreen 204 to new positions at touchscreen 204 that are determined based on the manner in which device 200 is tilted. A user can therefore tilt device 200, for example, with one hand, to rearrange the location of the application icons such that the user can conveniently reach/access the application icons with the one hand. Furthermore, when the user wishes for the application icons to return to their original locations at touchscreen 204 prior to the adjustment, the user can input a restore command.

Figure 3:
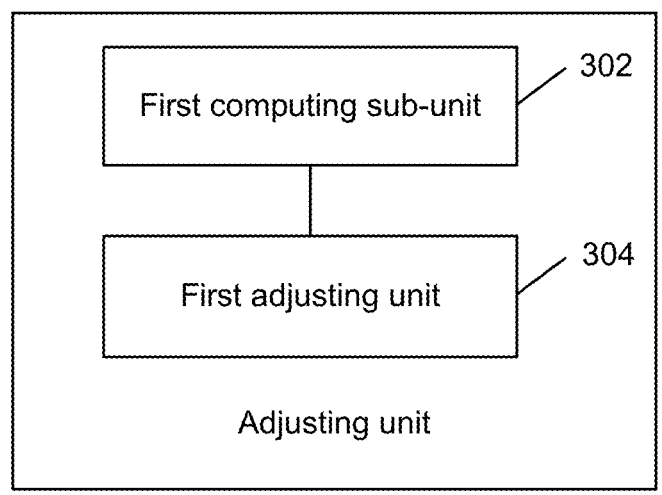
FIG. 3 is a diagram showing an example of an adjusting unit.

FIG. 3 is a diagram showing an example of an adjusting unit. In some embodiments, adjusting unit 110 of device 100 of FIG. 1 can be implemented using the example of FIG. 3. In some embodiments, adjusting unit 210 of device 200 of FIG. 2 can be implemented using the example of FIG. 3. In the example, the adjusting unit comprises first computing sub-unit 302 and first adjusting unit 304.

First computing sub-unit 302 is configured to compute, in real-time, the distance(s) that the application icons are to move on the touchscreen of the device from their original locations, based on the tilt angle of the device (as determined by a computing unit of the device) and using a predetermined conversion ratio, as will be described in further detail below.

First adjusting unit 304 is configured to compute, in real-time, the distance(s) that the application icons are to slide in the tilt direction on the touchscreen of the device, as will be described in further detail below.

Figure 4:
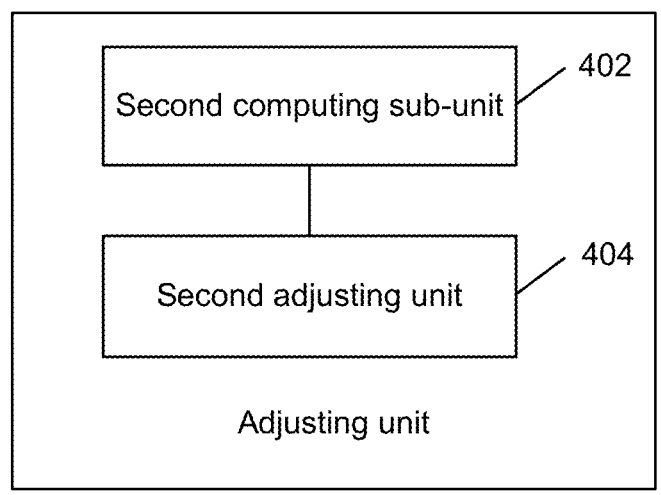
FIG. 4 is a diagram showing an example of an adjusting unit.

FIG. 4 is a diagram showing an example of an adjusting unit. In some embodiments, adjusting unit 110 of device 100 of FIG. 1 can be implemented using the example of FIG. 4. In some embodiments, adjusting unit 210 of device 200 of FIG. 2 can be implemented using the example of FIG. 4. In the example, the adjusting unit comprises second computing sub-unit 402 and second adjusting unit 404.

Second computing unit 402 is configured to compute, in real-time, the distance(s) that the application icons are to move on the touchscreen of the device, based on the tilt angle of the device (as determined by a computing unit of the device) and using a predetermined correspondence between the tilt angle and the movement distance(s), as will be described in further detail below.

Second adjusting unit 404 is configured to adjust and/or animate, in real-time, the computed distances that the application icons are to slide in the tilt direction on the touchscreen of the device, as will be described in further detail below.

Figure 5:
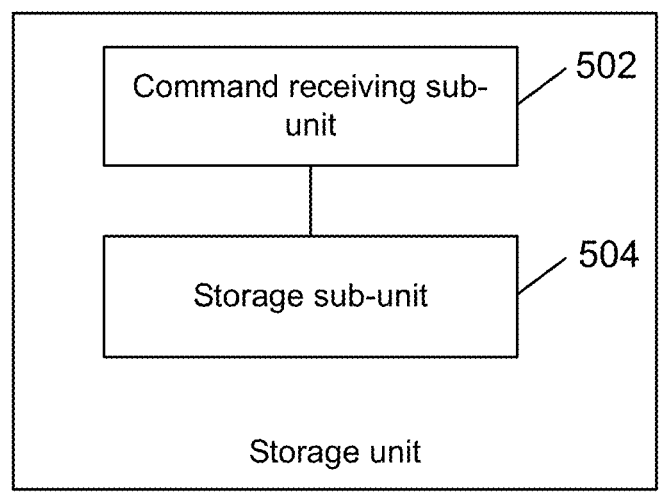
FIG. 5 is a diagram showing an example of a storage unit.

FIG. 5 is a diagram showing an example of a storage unit. In some embodiments, storage unit 216 of device 200 of FIG. 2 can be implemented using the example of FIG. 5. In the example, the storage unit comprises command receiving sub-unit 502 and storage sub-unit 504.

Command receiving sub-unit 502 is configured to receive the user's confirmation command (e.g., a user input at the touchscreen of the device) to store the current display area of the application icons at the device screen as the confirmed adjusted display area.

Storage sub-unit 504 is configured to store the current display area of the application icons as the confirmed adjusted display area to which the application icons have been adjusted on the screen. In some embodiments, storage sub-unit 504 is configured to store the adjusted size (e.g., length and width dimensions), orientation, and/or location of the display area of application icons at the screen of the device and/or the adjusted locations of the application icons at the screen of the device.

Figure 6:
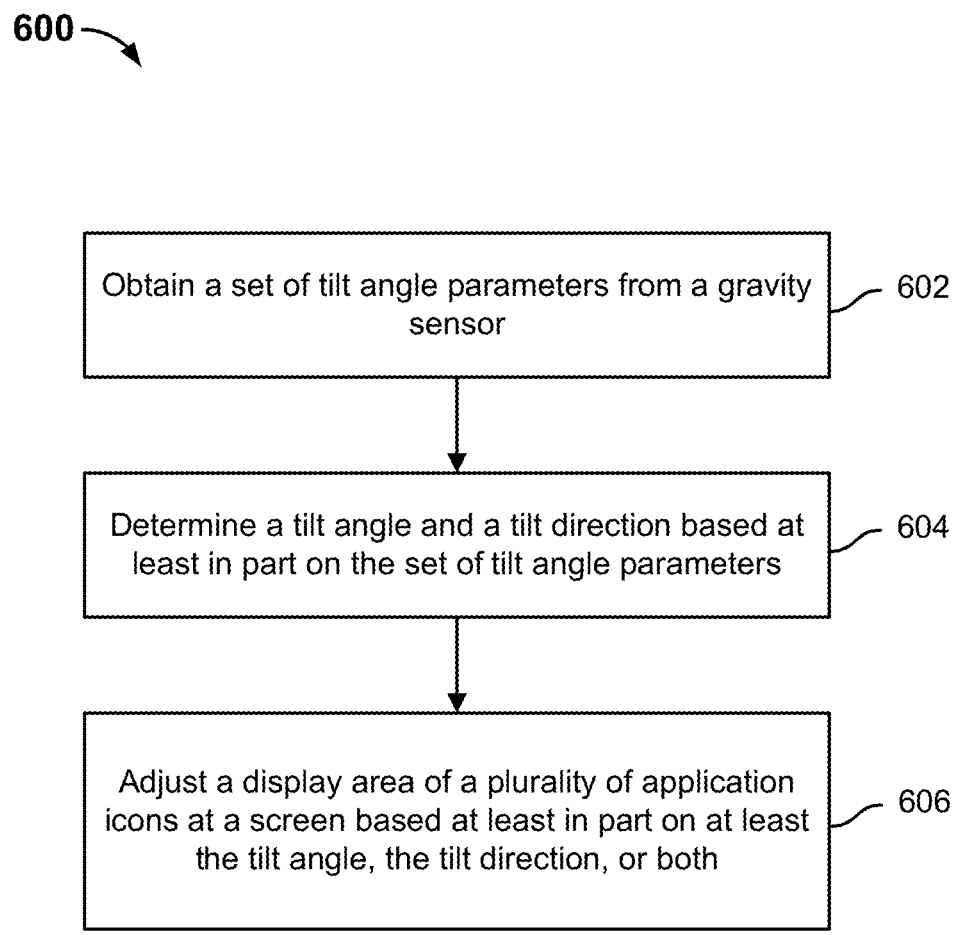
FIG. 6 is a flow diagram showing an embodiment of a process for adjusting the display area of application icons at a device screen.

FIG. 6 is a flow diagram showing an embodiment of a process for adjusting the display area of application icons at a device screen. In some embodiments, process 600 is implemented at device 100 of FIG. 1. In some embodiments, process 600 is implemented at device 200 of FIG. 2.

At 602, a set of tilt angle parameters is received from a gravity sensor.

A gravity sensor embedded in a device is configured to measure a set of tilt angle parameters in response to a movement (e.g., a tilt) of the device. The set of tilt angle parameters describes accelerations of the device in multiple dimensions, which can be converted into values that describe the movement or tilt of the device. As described above, a set of tilt angle parameters comprises accelerations along the X, Y, and Z axes and the values can be measured in units of gravity, for example.

In some embodiments, a settings prompt panel is triggered to be displayed at the device screen. The settings prompt panel displays instructions that describe how tilting the device will cause the display area of the application icons to be adjusted. Triggering the display of the settings prompt panel also causes the gravity sensor to measure the set of tilt angle parameters to use in performing the adjustment of the display area.

In some embodiments, the settings prompt panel comprises a floating prompt that overlays content presented at the touchscreen of the device. The use of such a settings prompt panel may make the adjustment feature be more user friendly. In some embodiments, the settings prompt panel comprises information (e.g., text and/or images) to the user, such as, for example, directions regarding tilting the device to adjust the display area of application icons. For example, the settings prompt panel may display the following: "please rotate the device to the horizontal position and/or tilt the device, then lightly tap the screen to complete the adjustment when an appropriate position has been reached" to inform the user how to perform the operation to adjust the display area of application icons. For example, the settings prompt panel is configured to overlay the presentation associated with an executing application at the touchscreen of the device or overlay the presentation of the desktop of the operating system at the touchscreen of the device. In some embodiments, the settings prompt panel does not affect the user's input operations and is only presented for a predetermined length of time before disappearing. In some embodiments, on devices that run the Android operating system, a Toast widget can be used to implement the settings prompt panel.

In some embodiments, there are two techniques of triggering the settings prompt panel. The first technique is one in which the user is passive in triggering the settings prompt panel and the second technique is one in which the user is active in triggering the settings prompt panel. As will be described in further detail below, the first technique that is referred to as the "user passive setting" refers to automatically displaying the settings prompt panel when a certain condition is met and the second technique that is referred to as the "user active setting" refers to displaying the settings prompt panel in response to the user's active selection of a preconfigured option to set the display area of the applications icons.

1) User Passive Setting

Using this technique allows the device to automatically determine whether or not to display the settings prompt panel and therefore enable the adjustment of the display area of application icons based on user behavior. As such, the user passive setting displays the settings prompt panel in response to a preset condition being met.

Various different preset conditions may be set and when any of such preset conditions is met, the settings prompt panel is displayed. A first example preset condition is when the device is tilted in the horizontal position, it is determined that, based on historical records, the device has not been tilted horizontally before and that the settings prompt panel has not been displayed before. Using this first example preset condition, when the device is turned on and the screen is unlocked, if the user holds the device in the horizontal position and tilts it to the left or right, the settings prompt panel is triggered. If it is the first time that the settings prompt panel is displayed, then this display instance forms a historical record and this record is stored, so that subsequently, if only the condition of tilting the touchscreen equipment in the horizontal position is satisfied, the settings prompt panel will not be triggered to be displayed directly. As such, this first example preset condition allows for the settings prompt panel to be displayed if the settings prompt panel has never been displayed when the device is tilted in the horizontal position for the first time.

A second example preset condition is when the count (i.e., the cumulative number) of touches to the touchscreen that result in invalid operations is greater than or equal to a preset number. In some embodiments, "invalid operations" refer to tap operations performed by the user on the touchscreen of the device that do not result in a valid operation (e.g., the successful launching of an application or the successful selection of a presented option). For example, if the user taps on the desktop that is displayed at the touchscreen (e.g., instead of an application icon to execute the associated application), then the user's tap operation is considered to be an invalid tap operation. If the number of invalid tap operations performed by the user exceeds a certain preset number, then it is assumed that the current display area of the application icons exceeds the user's conventional tap range. When this preset condition is satisfied, the settings prompt panel is triggered to be displayed, so that the user can be informed to use the display area adjustment techniques as described herein. For example, the operating system can be configured to count the number of the user's tap operations on the touchscreen and determine the cumulative number of invalid tap operations performed by the user before an application icon on the touchscreen is accurately opened and if the cumulative number of invalid tap operations exceeds the preset number, the settings prompt panel is triggered to be displayed. In some embodiments, the count of the number of invalid tap operations is reset to zero once the settings prompt panel is triggered to be displayed and/or a user performs a valid tap operation (e.g., a tap operation on an application icon that results in the execution of the associated application).

In some embodiments, invalid tap operations can also refer to tap operations with respect to one preset embedded point of potentially multiple preset embedded points on the touchscreen. In some embodiments, "embedded points" refer to points preconfigured at various locations at the touchscreen and/or a page associated with an application that when tapped, are configured to transmit the location of the current tap by the user (when the user is not performing matters related to the page display to the server, which records the user's click actions). For example, certain embedded points can be preconfigured in the periphery of the application icons in the touchscreen in order to facilitate the recording of certain tap operations of the user's that do not touch an application icon. For example, for users who are accustomed to operating the device with the right hand, each invalid tap operation (before the user actually taps an application icon and opens an operation icon) that corresponds to an embedded point on the left half of the touchscreen is separately recorded as one invalid tap operation corresponding to that preset embedded point. The number of invalid tap operations with respect to different embedded points is not summed, and each of the user's invalid tap operation actions corresponding to an individual preset embedded point is recorded in the system background. When the number of times a particular preset embedded point is tapped (i.e., the number of invalid tap operations corresponding to that preset embedded point) exceeds a preset number, the settings prompt panel is triggered to be displayed.

2) Active Setting by the User

Using this technique, a "setting the display area of application icons" option is preconfigured in the operating system and the user can actively select this option to choose to adjust the display of the settings prompt panel. For example, the device's operating system can be configured to provide a gateway, e.g., the "display settings prompt panel" option through a set of settings and/or menu options, and the user can engage in active setting through this gateway. Once the preconfigured "setting the display area of application icons" option is selected by the user, the settings prompt panel is triggered to be displayed, which causes the gravity sensor to detect the tilt angle parameters.

After the settings prompt panel has been triggered to be displayed by the above-described user active or user passive setting techniques, the gravity sensor begins to detect a set of tilt angle parameters and then causes the application icons on the touchscreen to appear to "slide" to the left, right, up, or down along the touchscreen based on the angle by which the user rotates the device, until the user finds the display area of application icons that best suits him or her. The sliding motion of the icons can be implemented using animation functionalities supported by the device's application programming interfaces and libraries. In some embodiments, the displayed settings prompt panel includes a control that confirms the user's interest to adjust the display area of application icons at the device screen. In some embodiments, the gravity sensor begins to detect a set of tilt angle parameters in response to the selection of such a control. Therefore, the user is enabled to customize the adjustment of the display area of application icons to make an improvement to his or her user experience of the device.

At 604, a tilt angle and a tilt direction are determined based at least in part on the set of tilt angle parameters.

In various embodiments, the values corresponding to the X, Y, and Z axes that are included in the tilt angle parameters are utilized to derive a trigonometric function. The tilt angle and/or tilt direction of the device can be determined from the trigonometric function. For example, the trigonometric function may comprise a function of the X, Y, and Z values that can be used to determine an angle relative to the X-Y plane, e.g., tilt angle=$\tan^{-1}(z/\sqrt{x^2+y^2})$. For example, the tilt direction of the device may be determined based on a function of at least one of the X, Y, and Z values. For instance, if the X value were positive, then the tilt direction can be determined to point towards the negative X axis (e.g., the left side of the device) and if the X value were negative, then the tilt direction can be determined to point towards the positive X axis (e.g., the right side of the device).

At 606, a display area of a plurality of application icons at a screen is adjusted based at least in part on at least one of the tilt angle and the tilt direction.

After the tilt angle and tilt direction of the device are obtained through computations, the display area of the application icons on the screen can be adjusted based on at least one of the determined tilt angle and the determined tilt direction.

Figure 7A:
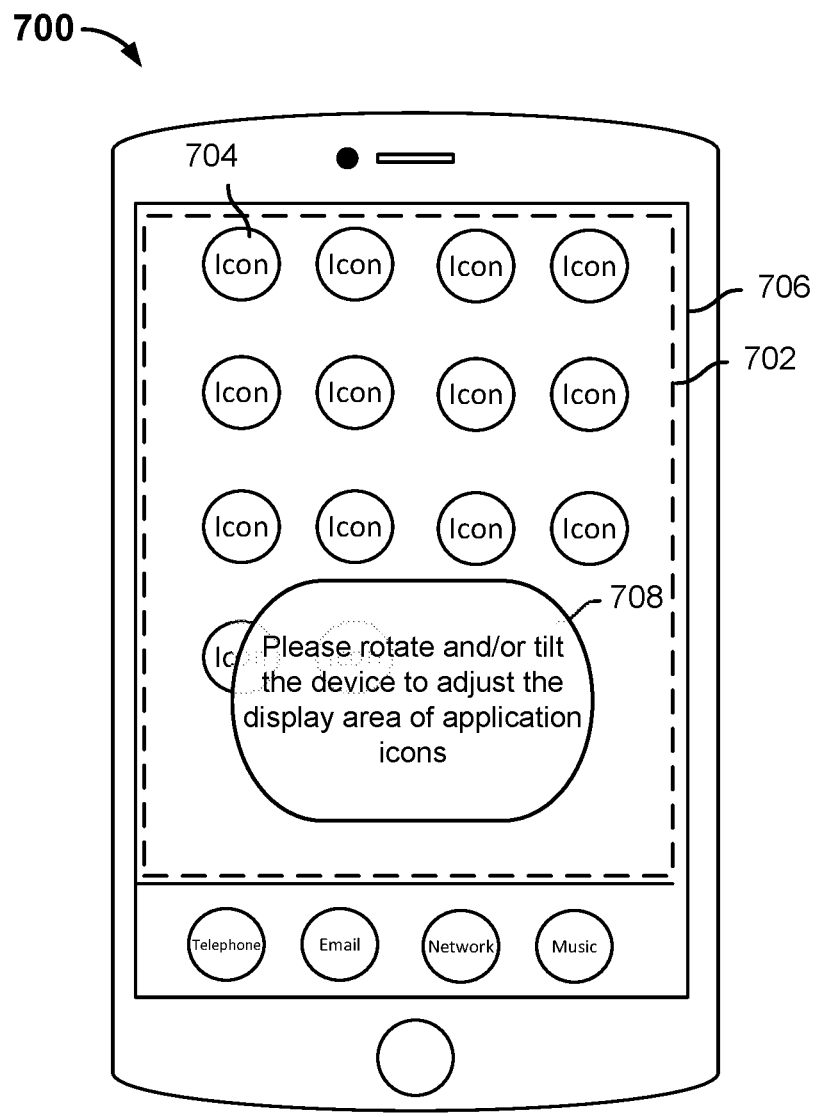
FIG. 7A is a diagram showing a display area of application icons at a screen of a device prior to an adjustment of the display area.

FIG. 7A is a diagram showing a display area of application icons at a screen of a device prior to an adjustment of the display area. As shown in the example, the application icons, which are shown as circles with the words "icon" written inside them, are each displayed in display area 702 of device 700 at their respective original locations. In this example, display area 702 is the original, pre-adjustment display area of the application icons of touchscreen 706 of device 700 and covers most of/the entirety of touchscreen

706 of device 700. In some embodiments, the original location of each application icon is determined and/or stored by the operating system.

For example, the size of touchscreen 706 is large enough such that a user may have difficulty holding device 700 with one hand and also using that same hand to access (e.g., touch) the application icons associated with applications that the user would like to execute. For instance, a right handed user may hold device 700 with his right hand, but due to the large size of touchscreen 706, the user may have trouble reaching application icon 704 located at the top left corner of display area 702 using his right thumb. As such, the user may desire to adjust the display area in which the application icons of touchscreen 706 are displayed such that the locations of at least some of the application icons, including application icon 704, are changed at touchscreen 706 so that he can more conveniently access them with his right hand.

Settings prompt display 708 may be triggered to be displayed at device 700 based on either the user passive setting or the active setting by user technique, as described above. In the example of FIG. 7A, settings prompt display 708 includes instructional text ("Please rotate and/or tilt the device to adjust the display area of application icons") to the user regarding how to manipulate device 700 to change the display area of application icons. For example, settings prompt display 708 may cease to be displayed after a predetermined length of time. After settings prompt display 708 is triggered to be displayed at device 700, the gravity sensor located in device 700 is configured to measure a set of tilt angle parameters associated with device 700. In this example, the user tilts/rotates device 700 towards the right to cause a set of tilt angle parameters to be measured that result in the display area of application icons at device 700 to be adjusted to cover only the right three quarters of touchscreen 706.

Figure 7B:
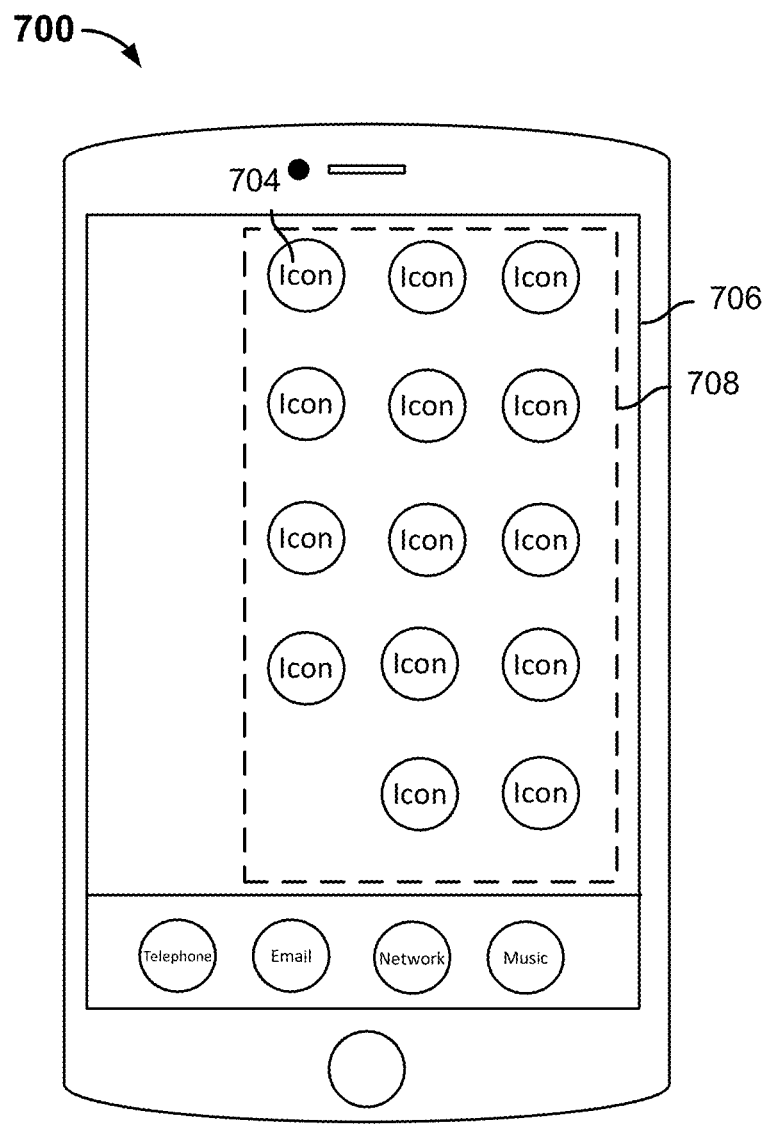
FIG. 7B is a diagram showing a display area of application icons at a screen of a device after an adjustment of the display area.

FIG. 7B is a diagram showing a display area of application icons at a screen of a device after an adjustment of the display area. Continuing the example from FIG. 7A, after the user had tilted/rotated device 700 towards the right, the resulting set of tilt angle parameters is used to determine a corresponding tilt angle and a corresponding tilt direction. In this example, display area 708 is the post-adjustment display area of the application icons of touchscreen 706 of device 700 and covers only 75% of touchscreen 706 of device 700 from the right side of touchscreen 706 of device 700. The application icons in FIG. 7B have been moved from their original locations in original display area 702 of FIG. 7A to new locations in adjusted display area 708. In some embodiments, the application icons can be animated to appear to slide from their original locations in the original display area to their new locations in the adjusted display area. The locations of application icons in adjusted display area 708 have therefore been customized using the tilt angle and the tilt direction of device 700. In adjusted display area 708, the application icons, including application icon 704, have been moved closer to the right hand side of touchscreen 706 and are now more easily accessible for the user that wishes to access the applications icons of device 700 using only his right hand.

In actual application, there may be various implementation techniques to adjust the display area of application icons on the screen based on the tilt angle and tilt direction of the device. Below are some example techniques for adjusting the display area of application icons on the screen based on the tilt angle and/or tilt direction of the device.

Adjustment technique 1: The adjustment of the display area of the application icons is determined based on the tilt angle, the tilt direction, and a predetermined conversion ratio. For example, the predetermined conversion ratio may be as follows:

Percentage of the touchscreen width to be used as the display area of the application icons=[(90−tilt angle in degrees)/90]*100.

So if the tilt angle were 0, then the percentage of the touchscreen width to be used as the display area of the application icons=[(90−0)/90]*100=100%, meaning that the entire width of the touchscreen can be used as the display area. In another example, if the tilt angle were 45, then the percentage of the touchscreen width to be used as the display area of the application icons=[(90−45)/90]*100=50%, meaning that only half of the width of the touchscreen can be used as the display area. If the tilt direction were left (in the negative X direction), then the adjusted display area would be the left half of the width of the touchscreen. In this first example adjustment technique, the movement distance of the application icons on the screen is computed in real-time and the movement distance that the application icons slide in the tilt direction is applied (e.g., animated) in real-time. In some embodiments, each application icon moves a movement distance that is determined based at least in part on its current/origin location on the touchscreen. For example, if the tilt direction were 15 degrees towards the left, then those application icons that are currently/originally closer to the left side of the device will move less towards the left than those application icons that are currently/originally farther from the left side of the device.

Using this first example adjustment technique, the movement distance of the application icons from their original locations on the screen is computed in real-time based on the tilt angle and using a predetermined conversion ratio. Because the movement distance is computed using a conversion ratio, the movement distance obtained through computations using this technique comprises continuous data (e.g., values that are not fixed). The specific conversion ratio is related to the dimensions of the touchscreen and the gravity sensor.

Adjustment technique 2: The adjustment of the display area of the application icons is determined based on the tilt angle, the tilt direction, and predetermined correspondences between a range of tilt angles and corresponding movement distances. In this second example adjustment technique, the movement distances of the application icons on the screen are determined in real-time and the movement distances that the application icons slide in the tilt direction are applied (e.g., animated) in real-time.

Using this second example adjustment technique, the movement distances of the application icons on the screen from their original locations are computed in real-time based on the tilt angle and using preset correspondences between ranges of tilt angles and corresponding movement distances. The preset correspondences between ranges of tilt angles and movement distances comprise various ranges of tilt angles and a preset movement distance corresponding to each range of tilt angle. In this technique, the movement distances corresponding to the application icons are not obtained based on a formula; rather, the movement distances are based on the preset correspondences between ranges of tilt angles and movement distances. In some embodiments, each movement distance comprises a discrete (e.g., fixed) distance value. For example, the correspondences between ranges of tilt angles and movement distances can be configured based on empirical values determined from historical user experiences. Using this second example adjustment technique, the movement distances can be set as several grades. For example, if the tilt angle is within range 1, then the corresponding movement distance is distance 1 (e.g., 100 pixels); if the tilt angle is within range 2, then the corresponding movement distance is distance 2 (e.g., 200 pixels); etc. In some embodiments, each application icon moves at least a portion of the movement distance based at least in part on its current/origin location on the touchscreen. For example, if the device is tilted towards the left or the right, application icons closer to an edge (e.g., a side) of the screen may move less than the full movement distance towards the edge whereas application icons farther from an edge (e.g., a side) of the screen may move up to the full movement distance towards the edge.

Adjustment technique 3: The adjustment of the display area of the application icons is determined based on the tilt direction and a preset distance in the tilt direction.

Using this third example adjustment, each of the application icons is moved a preset movement distance from their original locations in the tilt direction, regardless of the tilt angle. Put another way, the distance in which the application icons are slid across the touchscreen is simply a preset fixed value, regardless of the tilt angle. This example adjustment technique is the simplest of the three techniques described herein. For example, when the device is tilted to the left, the application icons are adjusted to move to an area in the left half or left one third of the touchscreen. This third example adjustment technique is a special case of the second adjustment technique. In some embodiments, each application icon moves at least a portion of the movement distance based at least in part on its current/origin location on the touchscreen. For example, if the device is tilted towards the left or the right, application icons closer to an edge (e.g., a side) of the screen may move less than the full movement distance towards the edge whereas application icons farther from an edge (e.g., a side) of the screen may move up to the full movement distance towards the edge.

After the display area of the application icons is adjusted based on the tilt direction and/or tilt angle, in some embodiments, the adjusted display area of the application icons is stored.

After the user has caused the display area of the application icons to be adjusted to a suitable point by tilting the device, it is desirable to save this adjusted display area in order to facilitate the user's continued use of this adjusted display area that suits his or her use habits. In some embodiments, storing the adjusted display area of the application icons comprises storing the size (e.g., length and width dimensions), orientation, and/or location of the adjusted display area and/or the adjusted locations of the application icons at the screen. In some embodiments, the adjusted display area of the application icons is stored in response to a user input confirmation command to store the adjusted display area. For example, the user's input confirmation command to store the adjusted display area of application icons is received and in response, the adjusted display area of the application icons at the time that the confirmation command is received is stored.

In some embodiments, the user input confirmation command may comprise a minimum one or more of the following: a predetermined confirmation hand gesture, a user selection of a presented button, or a user input motion. The user input confirmation command is configured to cause the adjusted display area of application icons to be stored. For example, the confirmation command may comprise a hand gesture such as a light touchscreen operation or another set hand gesture. The confirmation commands described herein are merely examples and any variety of techniques can be set to trigger the storage of the adjusted display area of application icons.

After the display area of the application icons is adjusted based on the tilt direction and/or tilt angle, in some embodiments, a restore command is used to restore the adjusted display area of the application icons to the original display area of the application icons prior to the adjustment.

After the user has caused the display area of the application icons to be adjusted to a suitable point by tilting the device, as the user's use habits change, it is possible that the user will wish to restore the display area of the application icons to the original display area, prior to the adjustment. To do so, the user may input the preset restore command to restore the display area of the application icons to their original locations on the screen.

In some embodiments, the restore command comprises a minimum of one of the following techniques: a predetermined restore hand gesture, a user selection of a presented button, or a user input motion. The user input restore command is configured to cause the adjusted display area of application icons to be restored to the original display area of the application icons. For example, the preset restore command may comprise a specific key, a touchscreen key, or a predetermined restore hand gesture that triggers the restore processing. Specifically, for example, the restore hand gesture can be a shaking gesture of the device or another set hand gesture. The restore commands as described herein are merely examples and any variety of techniques can be set to trigger the execution of restoring of the original display area of application icons.

Figure 8:
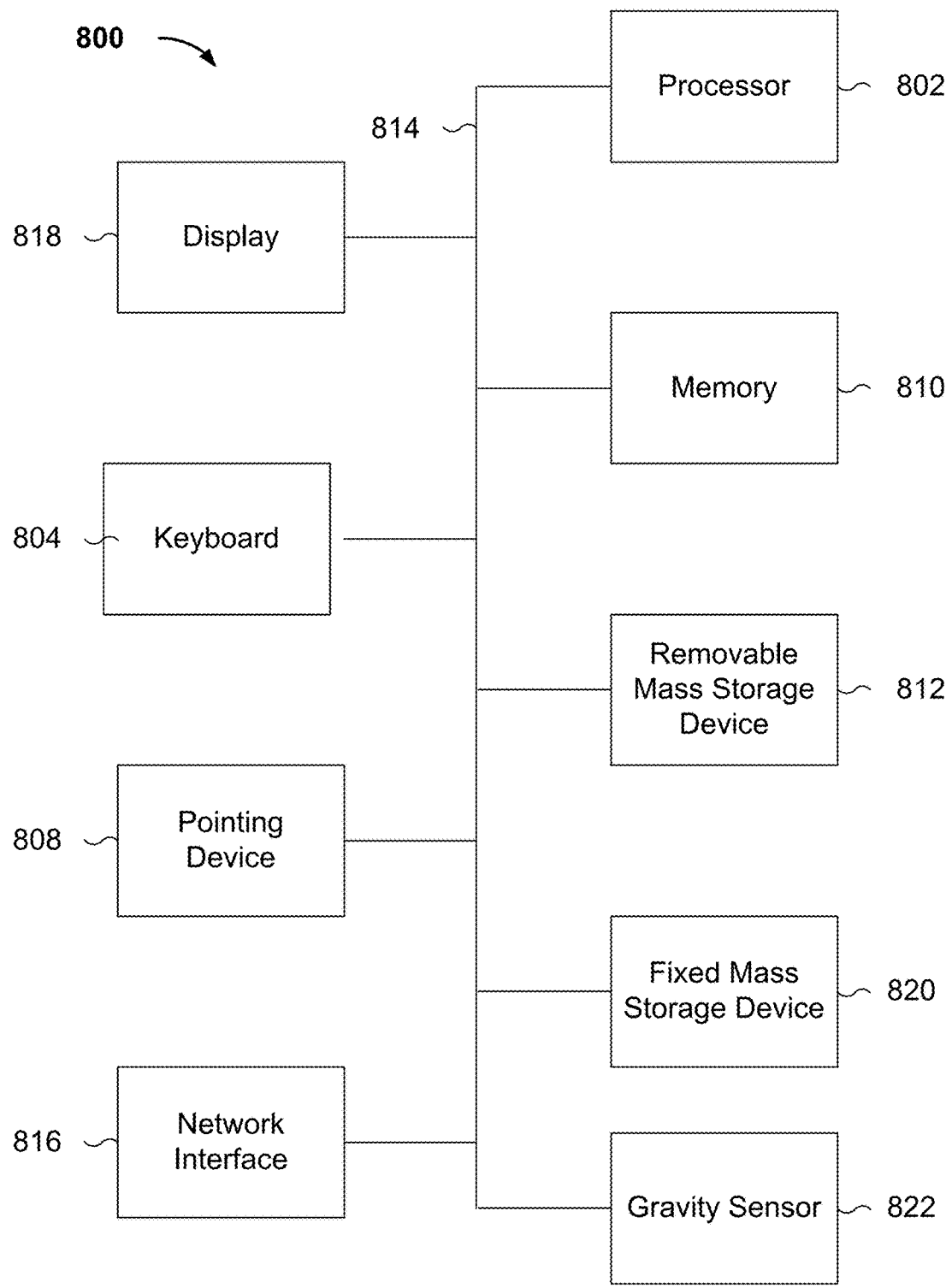
FIG. 8 is a functional diagram illustrating an embodiment of a programmed computer system for adjusting the display area of application icons at a screen of a device.

FIG. 8 is a functional diagram illustrating an embodiment of a programmed computer system for adjusting the display area of application icons at a screen of a device. As will be apparent, other computer system architectures and configurations can be used to adjust the display area of application icons at a screen of a device. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818). Gravity sensor 822 is configured to measure the tilt data associated with a movement of the device along one or more axes.

Processor 802 is coupled bi-directionally with memory 810, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800 and is coupled either bi-directionally (read/write) or uni-directionally (read only) to processor 802. For example, storage 812 can also include computer readable media such as magnetic tape, flash memory, PC-CARDS, portable mass storage devices, holographic storage devices, and other storage devices. A fixed mass storage 820 can also, for example, provide additional data storage capacity. The most common example of fixed mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display 818, a network interface 816, a keyboard 804, and a pointing device 808, as well as an auxiliary input/output device interface, a sound card, speakers, and other subsystems as needed. For example, the pointing device 808 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

In one typical configuration, the computation equipment comprises one or more processors (CPUs), input/output interfaces, network interfaces, and memory.

Memory may include such forms as volatile storage devices in computer-readable media, random access memory (RAM) and/or non-volatile memory, such as read-only memory (ROM) or flash memory (flash RAM). Memory is an example of a computer-readable medium.

Computer readable media include permanent, non-permanent, mobile, and non-mobile media that can be used to store information by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media (transitory media), such as modulated data signals and carrier waves.

A person skilled in the art should understand that the embodiments of the present application can be provided as methods, systems, or computer program products. Therefore, the present application may take the form of complete hardware embodiments, complete software embodiments, or embodiments that combine software and hardware. Moreover, the present application can be used in the form of a computer program product implemented on one or more computer-usable storage media that contain computer-usable program code (including but not limited to magnetic disk memory, CD-ROM, optical memory, etc.).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors; and
   one or more memories coupled with the one or more processors, wherein the one or more memories configured to provide the one or more processors with instructions which when executed cause the one or more processors to:
   obtain a number of invalid user tap operations with respect to a screen of a device, wherein an invalid user tap operation comprises a user tap operation with respect to an embedded point located in a periphery of a first application icon displayed at the screen;
   receive an indication that the number of invalid user tap operations exceeds a preset number;
   in response to the indication:
      present a settings prompt panel, wherein the settings prompt panel is configured to display information regarding how the device can be tilted to adjust a display area of a plurality of application icons at the screen; and
      in response to a user selection to perform an adjustment of the display area of the plurality of application icons at the screen, obtain a set of tilt angle parameters from a gravity sensor associated with the device;
      determine a tilt angle and a tilt direction based at least in part on the set of tilt angle parameters; and adjust the display area of the plurality of application icons at the screen based at least in part on the tilt angle, the tilt direction, or both, wherein to adjust the display area of the plurality of application icons comprises to:
  determine a preset movement distance corresponding to the tilt angle based at least in part on preset correspondences between ranges of tilt angles and corresponding preset movement distances;
  determine a first current location associated with the first application icon included in the plurality of application icons at the screen;
  determine a first distance between the first current location associated with the first application icon and an edge of the screen;
  determine a second current location associated with a second application icon included in the plurality of application icons at the screen;
  determine a second distance between the second current location associated with the second application icon and the edge of the screen;
  determine at least a first portion of the preset movement distance corresponding to the tilt angle to move the first application icon based at least in part on the first distance between the first current location associated with the first application icon and the edge of the screen;
  determine at least a second portion of the preset movement distance corresponding to the tilt angle to move the second application icon based at least in part on the second distance between the second current location associated with the second application icon and the edge of the screen, wherein the second distance is longer than the first distance, wherein the at least second portion of the preset movement distance to move the second application icon is longer than the at least first portion of the preset movement distance to move the first application icon;
  cause the first application icon to move the at least first portion of the preset movement distance in the tilt direction; and
  cause the second application icon to move the at least second portion of the preset movement distance in the tilt direction.

2. The system of claim 1, wherein the one or more processors are further configured to:
  determine that the device is tilted to the left or right for a first time; and
  in response to the determination that the device is tilted to the left or right for the first time, present the settings prompt panel.

3. The system of claim 1, wherein the one or more memories are further configured to provide the one or more processors with instructions which when executed cause the one or more processors to:
  receive a user selection of a preconfigured option to adjust the display area of the plurality of application icons; and
  in response to the receipt of the user selection of the preconfigured option, present the settings prompt panel.

4. The system of claim 1, wherein the one or more memories are further configured to provide the one or more processors with instructions which when executed cause the one or more processors to:
  receive a user input confirmation command associated with storing the adjusted display area of the plurality of application icons; and
  in response to the user input confirmation command, store the adjusted display area of the plurality of application icons.

5. The system of claim 4, wherein the user input confirmation command comprises one or more of the following: a predetermined confirmation hand gesture, a user selection of a presented button, or a user input motion.

6. The system of claim 1, wherein the one or more memories are further configured to provide the one or more processors with instructions which when executed cause the one or more processors to:
  receive a user input restore command associated with restoring the adjusted display area of the plurality of application icons to an original display area of the plurality of application icons; and
  in response to the user input restore command, restore the adjusted display area of the plurality of application icons.

7. The system of claim 6, wherein the user input restore command comprises one or more of the following: a predetermined confirmation hand gesture, a user selection of a presented button, or a user input motion.

8. A method, comprising:
  obtaining a number of invalid user tap operations with respect to a screen of a device, wherein an invalid user tap operation comprises a user tap operation with respect to an embedded point located in a periphery of a first application icon displayed at the screen;
  receiving an indication that the number of invalid user tap operations exceeds a preset number;
  in response to the indication:
    presenting a settings prompt panel, wherein the settings prompt panel is configured to display information regarding how the device can be tilted to adjust a display area of a plurality of application icons at the screen; and
    in response to a user selection to perform an adjustment of the display area of the plurality of application icons at the screen, obtaining, using one or more processors, a set of tilt angle parameters from a gravity sensor associated with the device;
  determining a tilt angle and a tilt direction based at least in part on the set of tilt angle parameters; and
  adjusting the display area of the plurality of application icons at the screen based at least in part on the tilt angle, the tilt direction, or both, wherein adjusting the display area of the plurality of application icons comprises:
    determining a preset movement distance corresponding to the tilt angle based at least in part on preset correspondences between ranges of tilt angles and corresponding preset movement distances;
    determining a first current location associated with the first application icon included in the plurality of application icons at the screen;
    determining a first distance between the first current location associated with the first application icon and an edge of the screen;
    determining a second current location associated with a second application icon included in the plurality of application icons at the screen;
    determining a second distance between the second current location associated with the second application icon and the edge of the screen;

determining at least a first portion of the preset movement distance corresponding to the tilt angle to move the first application icon based at least in part on the first distance between the first current location associated with the first application icon and the edge of the screen;

determining at least a second portion of the preset movement distance corresponding to the tilt angle to move the second application icon based at least in part on the second distance between the second current location associated with the second application icon and the edge of the screen, wherein the second distance is longer than the first distance, wherein the at least second portion of the preset movement distance to move the second application icon is longer than the at least first portion of the preset movement distance to move the first application icon;

causing the first application icon to move the at least first portion of the preset movement distance in the tilt direction; and causing the second application icon to move the at least second portion of the preset movement distance in the tilt direction.

9. The method of claim 8, further comprising:
determining that the device is tilted to the left or right for a first time; and
in response to the determination that the device is tilted to the left or right for the first time, presenting the settings prompt panel.

10. The method of claim 8, further comprising:
receiving a user selection of a preconfigured option to adjust the display area of the plurality of application icons; and
in response to the receipt of the user selection of the preconfigured option, presenting the settings prompt panel.

11. A computer program product, the computer program product being embodied in a non-transitory computer readable storage medium and comprising computer instructions for:
obtaining a number of invalid user tap operations with respect to a screen of a device, wherein an invalid user tap operation comprises a user tap operation with respect to an embedded point located in a periphery of a first application icon displayed at the screen;
receiving an indication that the number of invalid user tap operations exceeds a preset number;
in response to the indication:
presenting a settings prompt panel, wherein the settings prompt panel is configured to display information regarding how the device can be tilted to adjust a display area of a plurality of application icons at the screen; and
in response to a user selection to perform an adjustment of the display area of the plurality of application icons at the screen, obtaining a set of tilt angle parameters from a gravity sensor associated with the device;
determining a tilt angle and a tilt direction based at least in part on the set of tilt angle parameters; and adjusting the display area of the plurality of application icons at the screen based at least in part on the tilt angle, the tilt direction, or both, wherein adjusting the display area of the plurality of application icons comprises:
determining a preset movement distance corresponding to the tilt angle based at least in part on preset correspondences between ranges of tilt angles and corresponding preset movement distances;
determining a first current location associated with the first application icon included in the plurality of application icons at the screen;
determining a first distance between the first current location associated with the first application icon and an edge of the screen;
determining a second current location associated with a second application icon included in the plurality of application icons at the screen;
determining a second distance between the second current location associated with the second application icon and the edge of the screen;
determining at least a first portion of the preset movement distance corresponding to the tilt angle to move the application icon based at least in part on the first distance between the first current location associated with the first application icon and the edge of the screen;
determining at least a second portion of the preset movement distance corresponding to the tilt angle to move the second application icon based at least in part on the second distance between the second current location associated with the second application icon and the edge of the screen, wherein the second distance is longer than the first distance, wherein the at least second portion of the preset movement distance to move the second application icon is longer than the at least first portion of the preset movement distance to move the first application icon;
causing the first application icon to move the at least first portion of the preset movement distance in the tilt direction; and
causing the second application icon to move the at least second portion of the preset movement distance in the tilt direction.

12. The computer program product of claim 11, further comprising computer instructions for:
determining that the device is tilted to the left or right for a first time; and
in response to the determination that the device is tilted to the left or right for the first time, presenting the settings prompt panel.

13. The computer program product of claim 11, further comprising computer instructions for:
receiving a user selection of a preconfigured option to adjust the display area of the plurality of application icons; and
in response to the receipt of the user selection of the preconfigured option, presenting the settings prompt panel.

* * * * *